United States Patent [19]

Reifenhäuser et al.

[11] Patent Number: 5,030,082
[45] Date of Patent: Jul. 9, 1991

[54] EXTRUSION DIE FOR THERMOPLASTIC RESIN

[75] Inventors: Fritz Reifenhäuser, Troisdorf; Adolf Künstler, Cologne, both of Fed. Rep. of Germany

[73] Assignee: Reifenhäuser GmbH & Co. Maschinenfabrik, Troisdorf, Fed. Rep. of Germany

[21] Appl. No.: 429,836

[22] Filed: Oct. 31, 1989

[30] Foreign Application Priority Data

Nov. 26, 1988 [DE] Fed. Rep. of Germany ....... 3839980

[51] Int. Cl.⁵ .............................................. B29C 47/20
[52] U.S. Cl. ............................. 425/376.100; 425/382.4
[58] Field of Search ..................... 425/382.4, 461, 466, 425/467, 376.1, 380, 379.1, 381

[56] References Cited

U.S. PATENT DOCUMENTS

| | | | |
|---|---|---|---|
| 1,876,256 | 9/1932 | Maynard | 425/379.1 |
| 2,859,475 | 8/1956 | Tornberg | 425/466 |
| 3,193,879 | 7/1965 | Corbett | 425/461 |
| 3,195,183 | 7/1965 | Phillips | 425/466 |
| 3,709,645 | 1/1973 | Mraz | 425/467 |
| 4,224,272 | 9/1980 | Klein | 425/382.4 |
| 4,249,877 | 2/1981 | Machen | 425/379.1 |
| 4,290,989 | 9/1981 | Topor | 425/382.4 |
| 4,459,250 | 7/1984 | Miura | 425/382.4 |
| 4,468,366 | 8/1984 | Socha, Jr. | 425/461 |
| 4,595,546 | 6/1986 | Wheeler, Jr. | 264/349 |
| 4,826,422 | 5/1989 | Hunter | 425/382.4 |

FOREIGN PATENT DOCUMENTS

3332262 1/1986 Fed. Rep. of Germany .

Primary Examiner—Jay H. Woo
Assistant Examiner—William J. Natney, Jr.
Attorney, Agent, or Firm—Herbert Dubno; Andrew Wilford

[57] ABSTRACT

An extrusion die for a plastified thermoplastic resin has an outer part, an inner part inside the outer part and defining with it an annular passage, and webs supporting the inner part on the outer part and defining branch passages connecting an inlet passage formed by the parts to the annular passage. A restriction collar downstream of the branch passages is formed with teeth projecting only partly transversely across the annular passage and leaving an annular space clear for resin throughflow.

5 Claims, 3 Drawing Sheets

EXTRUSION DIE FOR THERMOPLASTIC RESIN

FIELD OF THE INVENTION

The present invention relates to a die. More particularly this invention concerns an extrusion die for a thermoplastic-resin molding machine.

BACKGROUND OF THE INVENTION

A standard nozzle or die for an extruder has an outer part and an inner or core part together defining an annular passage. The parts form an inlet passage connected to the extruder and webs extending between the parts support the core on the outer part and define branch passages that connect the inlet passage to the annular passage. Such a die is used to extrude tubes or sleeves and its outlet can form the workpiece directly or be connected to a further die from which the workpiece issues.

In the known systems the webs have an effect on the finished workpiece that can be determined by microscopic examination of it. The result is that the workpiece is not perfectly uniform and in fact is normally measurably weaker in the regions where the resin flow was interrupted by the webs of the die. Even when as described in German patent 3,332,262 (filed 07 Sept. 1983 by H. Reifenhauser and P. Reitemeyer) the branch passages are formed so that they decrease and then increase in flow cross section in the direction of flow of the resin through them, there are some improvements in the uniformity of the finished product, but there still is room for improvement.

OBJECTS OF THE INVENTION

It is therefore an object of the present invention to provide an improved die for a plastified synthetic resin.

Another object is the provision of such an improved die for a plastified synthetic resin which overcomes the above-given disadvantages, that is which eliminates the effects of the coresupporting webs in the finished workpiece.

A further object is an improved die wherein the webs flare and then taper upstream to downstream and wherein the branch passages go from upstream portions of cylindrical shape to downstream portions of flaring elliptical section as described in the above-cited German patent.

SUMMARY OF THE INVENTION

An extrusion die for a plastified thermoplastic resin according to this invention has an outer part, an inner part inside the outer part and defining therewith an annular passage, and webs supporting the inner part on the outer part and defining branch passages connecting an inlet passage formed by the parts to the annular passage. According to this invention a restriction collar downstream of the branch passages is formed with teeth projecting only partly transversely across the annular passage and leaving an annular space clear for resin throughflow.

The restriction teeth according to this invention leave a part of the annular passage unobstructed so that they do not influence a portion of the resin flow. The turbulence created by the webs separating the parts is virtually completely eliminated by this arrangement. The resin flow passes the restriction element generally undisturbed but the small turbulences created by the teeth of the restriction together cooperate to eliminate the influence of the upstream major turbulences created by the webs of the mold parts. At the same time the strength of the thermoplastic resin in the finished workpiece is not negatively affected. The reason for this apparently lies in the rheological and flow-related differences between the small-scale turbulence created by the teeth and the large-scale turbulence of the webs, it being understood that different rules apply to these two different types of turbulences. Nonetheless the effect is that the small-scale turbulences completely erase and cancel out the large-scale ones.

According to a feature of this invention the restriction collar is fixed on the outer part, with its teeth projecting inward. This makes it particularly easy to change the restriction collar and generally to make the mold. The collar is normally changed when the resin changes or when a workpiece of different dimensions is to be formed.

It is also possible according to the invention for the restriction collar to be fixed on the inner part. In fact another such collar can be fixed on the outer part and the collars can be transversely aligned with each other. This lastdescribed system is particularly good for eliminating the effects of the upstream webs.

In accordance with a further feature of the invention, the collar is formed by a stack of toothed plates with the teeth of each plate offset angularly from the adjacent plates. The teeth define gaps and the teeth of each plate are aligned with gaps of the adjacent plates. Furthermore one of the parts is formed at the collar with a bump restricting the flow cross section of the annular passage. The effect of this is an increase in the flow speed of the resin in the annular flow passage which has a beneficial effect on the homogeneity of the finished workpiece.

DESCRIPTION OF THE DRAWINGS

The above and other objects, features, and advantages will become more readily apparent from the following, reference being made to the accompanying drawings in which.

SPECIFIC DESCRIPTION

Figure 1:
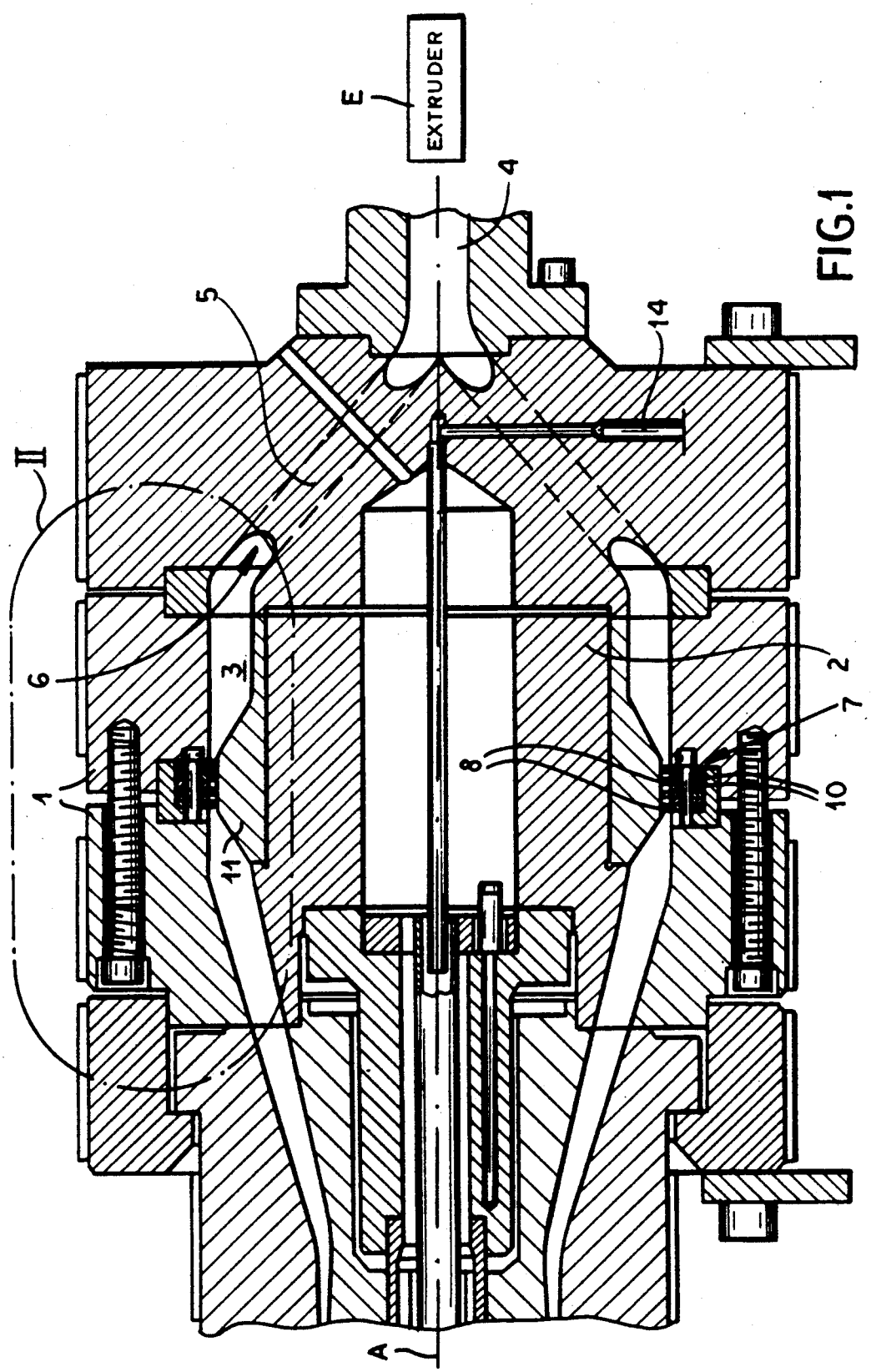
FIG. 1 is an axial section partly in diagrammatic form through the die according to this invention.
Figure 2:
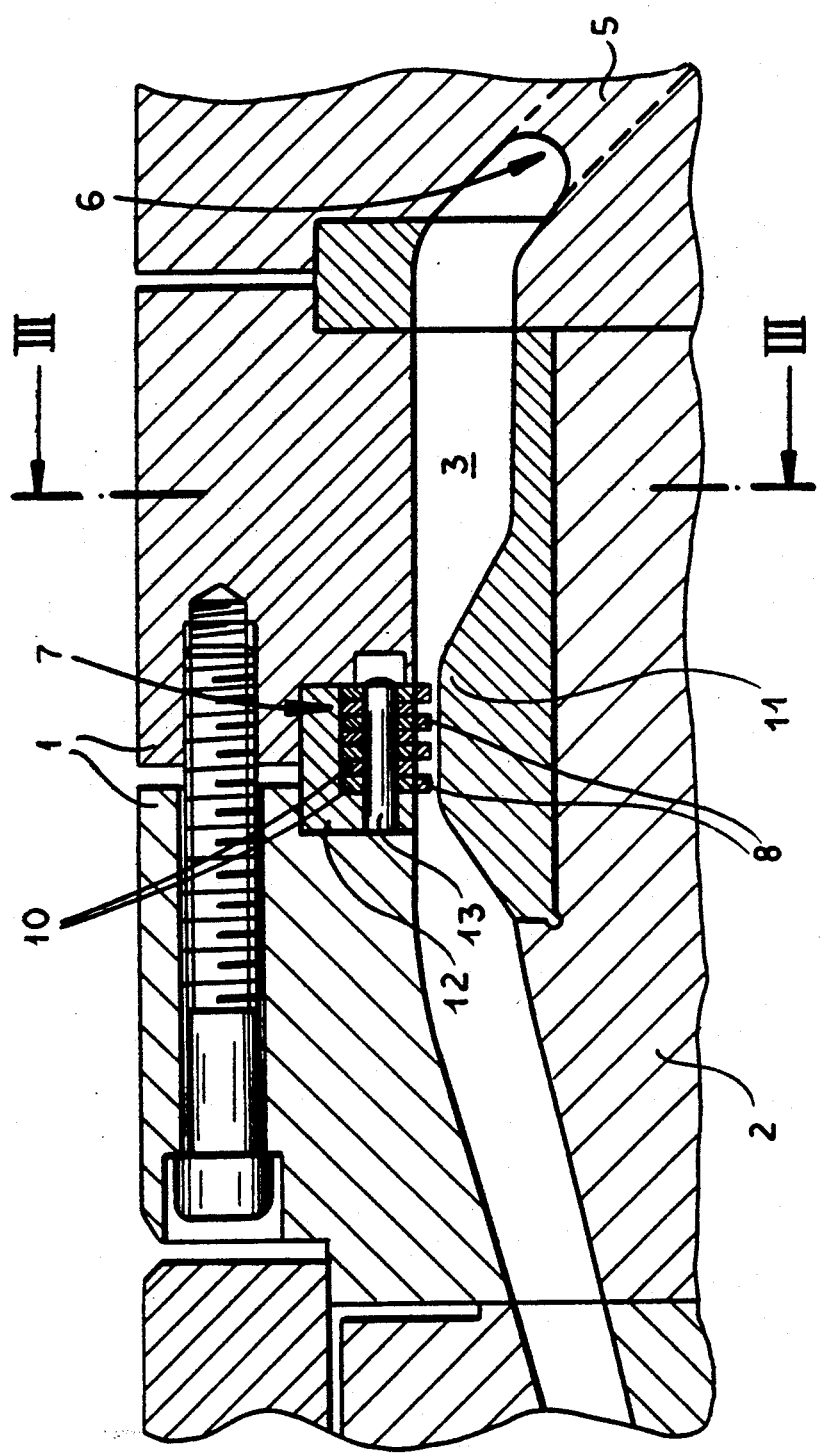
FIG. 2 is a large-scale view of the detail indicated at II in FIG. 1.
Figure 3:
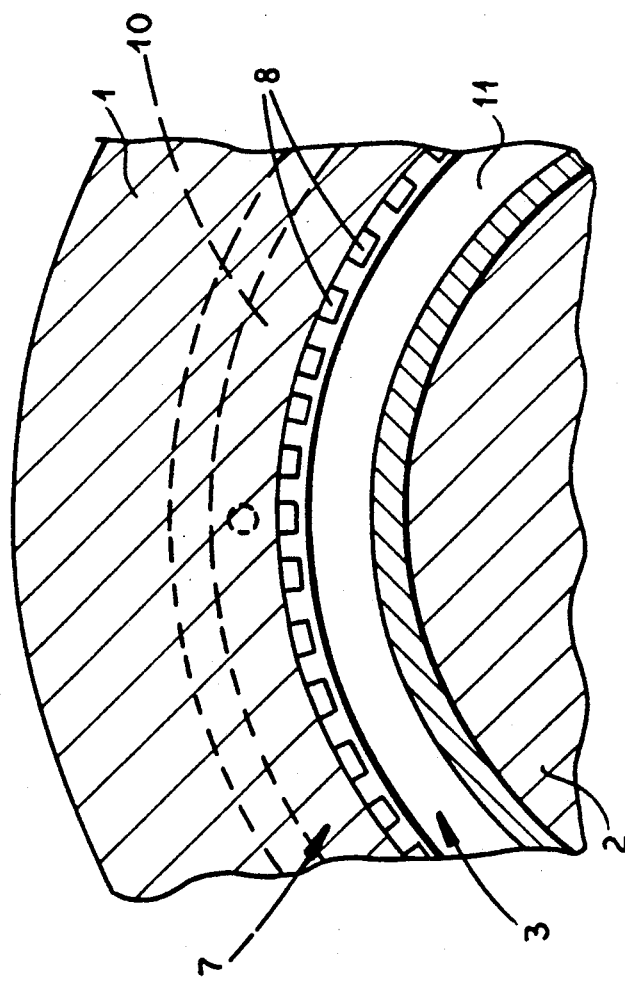
FIG. 3 is a section taken along line III—III of FIG. 2.

As seen in FIGS. 1 through 3 an extrusion die for a thermoplastic resin is connected to an extruder shown diagrammatically at E. It basically comprises an outer part 1 and an inner or core part 2 defining an annular space or gap 3 all centered on an axis A. On its upstream or input side (to the right in FIGS. 1 and 2) there is centered on the axis A an input passage 4 that receives the plastified resin from the extruder E. Branch passages 6 lead between webs 5 from this input passage 4 to the annular space 3, the webs 5 supporting the core 2 on the outer part 1. As described in above-cited German patent 3,332,262 the webs 5 can flare and then taper in the downstream direction, but this is not shown here in detail for clarity of view. In addition an air duct is provided for injecting a cooling fluid into the center of the tubular workpiece that emerges from the downstream end of the passage 3.

Figure 4:
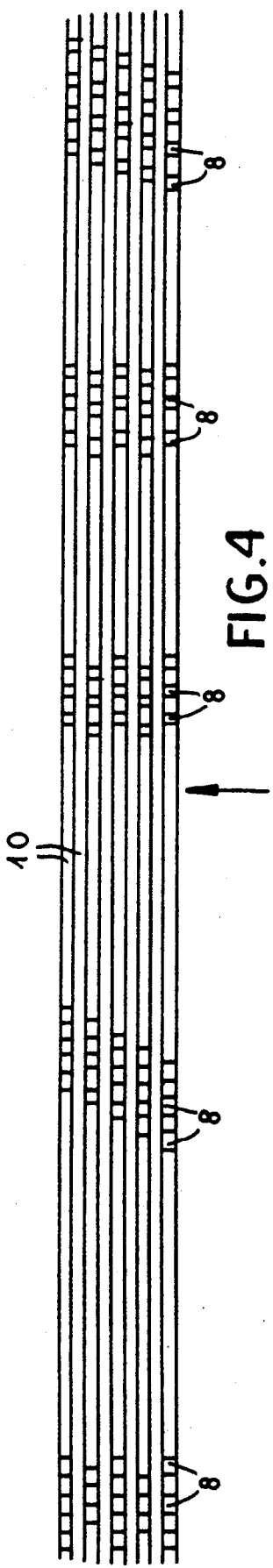
FIG. 4 are developed end views illustrating various restriction elements according to this invention.

In the illustrated embodiment and according to the invention there is a restriction collar 7 formed of a stack of disks 10 built into the die 1, 2. A seen in FIG. 4 the rings 10 form comb-like restriction tooth elements 8 that are offset from ring 10 to ring 10, with each element 8 aligned with an upstream gap. The core 2 has at the restriction collar 7, a nozzle-like formation 11 that restricts the space 3 at this region and accelerates the plastified resin.

As seen in FIG. 2 the restriction is formed by an L-section ring 12 provided with a plurality of pins 13 traversing the washer-like internally toothed disks 10 forming the restriction teeth 8. This ring 12 is sandwiched between the two halves of the outer part 1, making it very easy to insert and remove when, for instance, workpiece size or resin is changed.

Figure 5:
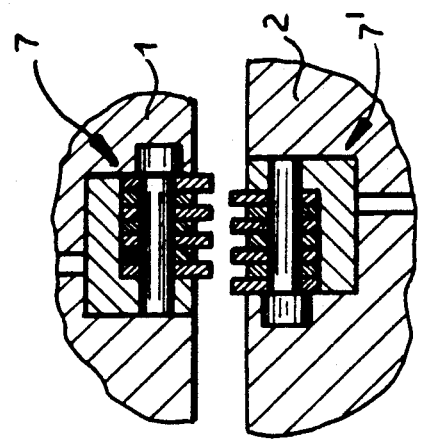
FIG. 5 is a section through a detail of another system according to this invention.

Furthermore as seen in FIG. 5 it is possible to provide the inner part with an externally toothed restriction collar 7' aligned radially relative to the axis A of the die with the collar 7. This combing of the inner and outer regions of the annular flow ensures that whatever nonuniformities are introduced into the flow by the webs 5 are completely eliminated.

What is claimed is:

1. An extrusion die for receiving a plastified thermoplastic resin from an extruder, the die comprising:
   an outer part:
   an inner part inside the outer part and defining therewith an annular passage, the parts forming an inlet passage adapted to receive the plastified resin from the extruder and opening into the annular passage;
   webs supporting the inner part on the outer part and defining branch passages connecting the inlet passage to the annular passage, whereby the resin from the extruder flows from the inlet passage through the branch passages to the annular passage;
   an annular bump formed on one of the inner and outer parts and projecting radially therefrom into the annular passage so as to locally restrict the flow cross section thereof; and
   a restriction collar fixed to the other one of the inner and outer parts downstream of the branch passages in radial alignment with the annular bump, the collar being formed by a stack of axially adjacent rings each formed with radially projecting teeth forming and separated by radially and axially open gaps, projecting only partly transversely across the annular passage, and leaving in the annular passage an annular space clear for resin throughflow, the teeth of each ring being axially generally aligned with the gaps of and angularly offset from the teeth of axially adjacent such rings.

2. The extrusion die defined in claim 1 wherein the restriction collar is fixed on the outer part.

3. The extrusion die defined in claim 1 wherein the restriction collar is fixed on the inner part.

4. The extrusion die defined in claim 3 wherein another such collar is fixed on the outer part.

5. The extrusion die defined in claim 4 wherein the collars are transversely aligned with each other.

* * * * *